United States Patent [19]

Tsubuku et al.

[11] 4,415,305
[45] Nov. 15, 1983

[54] HANDLING APPARATUS

[75] Inventors: Mitsuro Tsubuku; Tadanobu Yoshihiro, both of Kanagawa, Japan

[73] Assignee: Fuji Electric Co., Ltd., Kanagawa, Japan

[21] Appl. No.: 354,270

[22] Filed: Mar. 3, 1982

Related U.S. Application Data

[63] Continuation-in-part of Ser. No. 103,840, Dec. 12, 1979, abandoned.

[30] Foreign Application Priority Data

Dec. 12, 1978 [JP] Japan ............................ 53-154365
Dec. 11, 1979 [DE] Fed. Rep. of Germany ....... 2949745

[51] Int. Cl.$^3$ ............................................. B65G 57/03
[52] U.S. Cl. ..................................... 414/753; 294/97; 414/589
[58] Field of Search ................... 414/70, 71, 120-122, 414/589, 751, 753; 294/100, 115, 97; 271/90, 102

[56] References Cited

U.S. PATENT DOCUMENTS

| | | | |
|---|---|---|---|
| 2,320,094 | 5/1943 | Nash | 414/121 X |
| 3,021,169 | 2/1962 | Harry | 294/115 |
| 3,090,502 | 5/1963 | Gunzelmann | 414/71 |
| 3,534,872 | 10/1970 | Roth et al. | 414/120 |
| 3,558,127 | 1/1971 | Blewitt, Jr. | 271/155 |
| 3,809,423 | 5/1974 | Gazuit | 294/97 X |
| 3,902,214 | 9/1975 | Schmitt | 414/70 X |
| 4,079,846 | 3/1978 | Tsuruta | 414/120 X |
| 4,189,136 | 2/1980 | Robinette | 414/121 X |

*Primary Examiner*—Leslie J. Paperner
*Assistant Examiner*—Donald W. Underwood
*Attorney, Agent, or Firm*—Sughrue, Mion, Zinn, Macpeak and Seas

[57] ABSTRACT

A handling apparatus adapted for transferring machined pieces from one station to another. A hollow cylindrical arm is mounted vertically movable upon a frame which is laterally movable along a guide rail. Within the hollow arm are positioned an operating rod and a coaxial inner cylinder with a spring disposed between the ends of the inner cylinder and the cylindrical arm for biasing the inner cylindrical arm downwardly. A clamper including fingers which are spreadable by operation of the operational rod is formed at the lower position of the inner cylinder. Control switches for vertically moving the assembly are mounted alongside a control device positioned atop the inner cylinder and controlling the movement of the operational rod. A dog member mounted on top a rod coupled at its lower end to the lower end of the hollow arm controls the operation of the switches according to the relative vertical position of the hollow arm and the cylinder, which is sensed independent of the height of the stack of the pieces being transferred.

4 Claims, 7 Drawing Figures

FIG. 2
FIG. 3
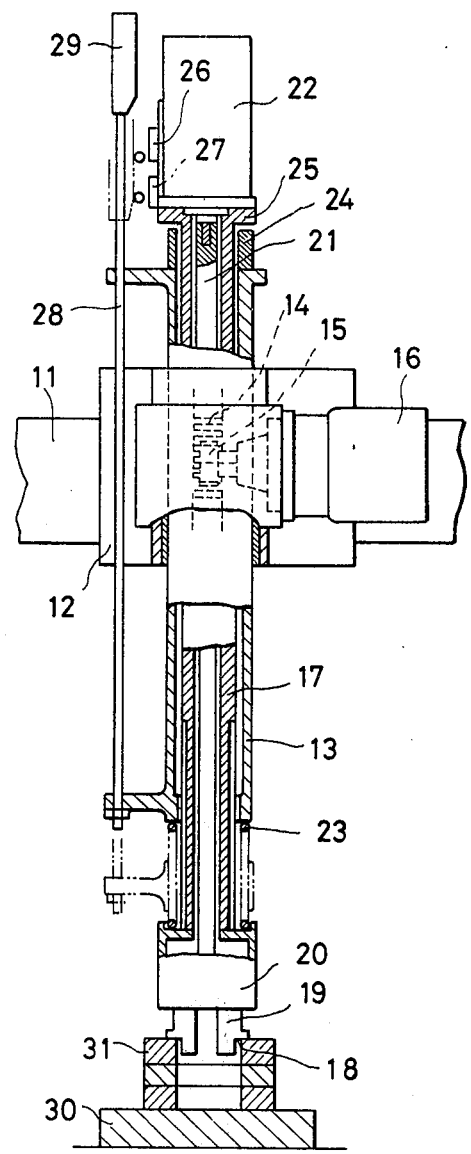
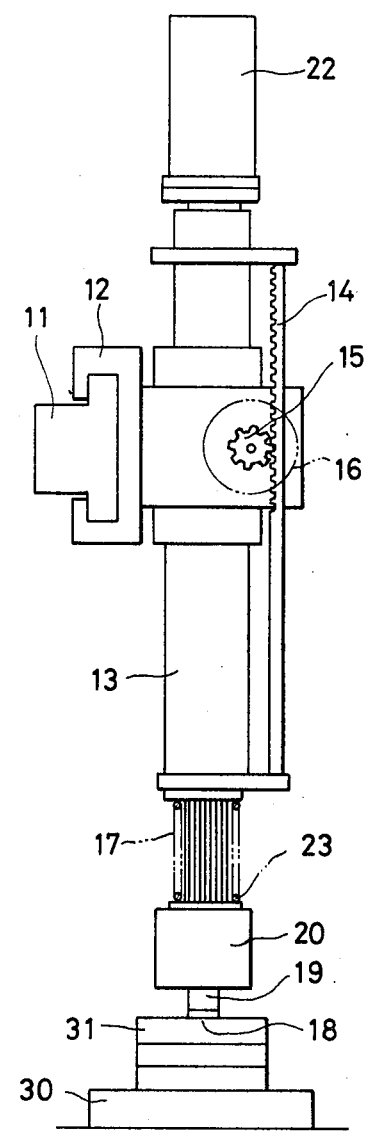

HANDLING APPARATUS

This is a continuation-in-part of application Ser. No. 103,840, filed Dec. 12, 1979 and now abandoned.

BACKGROUND OF THE INVENTION

The present invention relates to a handling apparatus. FIG. 1 shows a schematic front view of a prior art handling apparatus. A pair of handling devices 1A and 1B includes movable frames 3A and 3B, arms 5A and which are reciprocatingly movable by drive means 4A and 4B and supported on the laterally movable frames 3A and 3B, and clampers 6A and 6B mounted on lower portions of the respective arms 5A and 5B. Pieces to be machined or processed are moved onto a base station 7 by the laterally movable frame 3A in the handling device 1A. Then, the arm 5A is lowered so that the clamper 6A is positioned at a clamping position to grip the uppermost piece 8 of the pieces 80 stacked on the base station 7. The arm clamping the uppermost piece 8 is lifted and moved to a machining station 9 by the frame 3A and the arm 5A is lowered to release the piece 8 onto the machining station 9. This operation is to be repeated for each piece to be moved. During the repeated operation, the total height of the stack of pieces 80 is gradually decreased by the clamper 6A.

To remove the machined pieces from the station 9, the handling device 1B is moved by the laterally movable frame 3B toward the machining station 9 and the arm 5B is lowered to clamp the piece 8 disposed on the machining station 9. Then, the arm 5B is lifted and moved in parallel by the laterally movable frame 3B to transfer the machined piece onto an opposed base station 10. The piece 8 clamped by the clamper 6B is disposed on the base station 10 or stacked upon other pieces as the arm is lowered to thereby release the piece 8. Such operation is also repeated. With this technique, the height at which each piece is released is gradually increased. Therefore, in such handling devices, the lower end levels of the arms 5A and 5B thereof must be changed as the height of the stack changes. For this reason, it is impossible to use a simple limit switch due to the continuous height variation. Instead, a very complicated controlling device for continuously varying the lower end levels of the arms 5A and 5B, for example, a memory and computer device operated in accordance with some drive means such as a servo-motor or the like is required resulting in an increase in cost. This problem is inherent in the above-noted conventional device.

Accordingly, in view of the above-described defects, an object of the present invention is to provide a low cost handling device.

SUMMARY OF THE INVENTION

In accordance with this and other objects of the invention, there is provided a handling apparatus including a guide rail, a frame laterally along the guide rail, a hollow cylindrical arm movable in the vertical direction, an operational rod passing through the hollow cylindrical arm, an inner cylinder positioned within the cylindrical arm and around the operational rod, a spring disposed between ends of the inner cylinder and the cylindrical arm for biasing the inner cylinder downwardly, stop means for the spring, clamping means coupled to a lower end of the inner cylinder and being adapted for clamping the top one of a stack of pieces, a controller having a frame coupled to an upper end of the inner cylinder and being operationally coupled to the operational rod for operating the clamping means, a contact portion of the controller, which may be formed as finger means for contacting and sensing the uppermost surface of the top one of the pieces, whereby, when the contact portion abuts against the uppermost surface of the pieces only the arm can be further lowered, switch means mechanically coupled to the control means for controlling movements of the cylindrical arm, and dog means coupled at one end portion thereof to the arm, the dog means having a second end portion positioned adjacent the switch means for operating the switch means in accordance with the vertical position of the arm.

The switch means preferably comprises first and second limit switches which are mounted on an outer periphery, namely the frame, of the control means, with the first switch provided for decreasing the lowering speed of the arm and the second switch provided for stopping the lowering of the arm. There is further provided means for vertically moving the hollow cylindrical arm. In a preferred embodiment, the moving means includes a rack member coupled to the cylindrical arm, a motor and a pinion gear coupling the motor to the rack with the motor being controlled by the switch means.

BRIEF DESCRIPTION OF THE DRAWINGS

FIG. 2 is a cross-sectional view of a preferred embodiment of a handling apparatus according to the present invention;

FIG. 3 is a side view of the apparatus shown in FIG. 2;

DETAILED DESCRIPTION OF THE PREFERRED EMBODIMENTS

Figure 1:
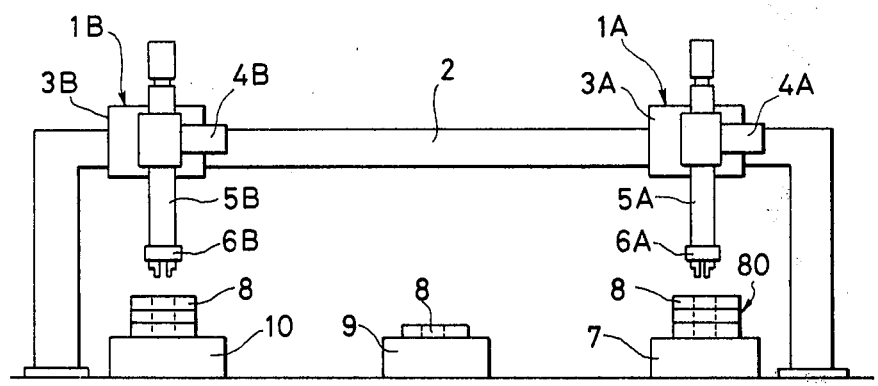
FIG. 1 is a schematic view of a prior art handling apparatus.

The present invention will be hereinafter described in reference to the accompanying drawings. FIG. 2 shows a frontal view of a handling apparatus constructed according to the present invention. FIG. 3 shows a side view of the apparatus shown in FIG. 2. In the handling apparatus, reference numeral 12 designates a laterally movable frame adapted to be guided by a guide rail 11. A drive member 16 having a pinion 15 is mounted on the frame 12. An associated rack 14 engageable with the pinion 15 is provided on a hollow cylindrical arm 13. The arm 13 is thus movable up and down with respect to the laterally movable frame 12 by rotation of the pinion 15. A clamper 20 includes an inner cylinder 17 passing through the interior of the cylindrical arm 13 and along with the cylindrical arm is movable in the vertical direction. Fingers 19 are mounted on a lower end of the inner cylinder 17. A controller 22 is mounted on an upper end of the inner cylinder 17 to control the clamper 20 through an operational longitudinal rod 21 passing through the inner cylinder 17.

Figure 2A:
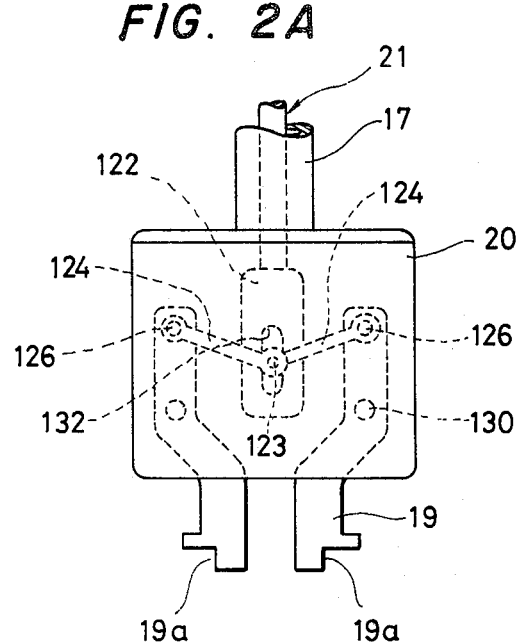
FIG. 2A is a detailed view of the gripping device illustrated in FIG. 2.

FIG. 2A illustrates one example of a clamper 20, which is adapted to grip aperatured items from the inside thereof. As seen in FIG. 2A, the longitudinal rod 21 passes through cylinder 17 and into the housing of the clamper mechanism. The rod 21 terminates in a portion 122 having connected thereto a pin 123. A pair of pivotable lever arms 124 connect the portion 122 to the fingers 19, by way of pivot pins 126. The fingers 19 are themselves pivotable about pins 130. Completing the arrangement is a slot 132 in the housing of clamper 20 which guides the pin 132, and therefore the junction of the lever arms 124, for vertical movement.

With the arrangement of FIG. 2A, downward movement of rod 21 is translated into gripping motion by the arms 124 and fingers 19, as the gripping surfaces 19a of the fingers are urged outwardly to grip an object (see FIG. 2) from the inside. Upward movement of the rod 21 similarly translates into inward movement, or a releasing of the grip, of the fingers.

A cylindrical sleeve 24 secured to the upper end of the cylindrical arm 13 is urged against a flanged portion 25 formed on an upper end of the inner cylinder 17 by a spring 23 disposed between the lower end of the arm 13 and the upper surface of the clamper 20 which forms a stop. A limit switch 26 for damping or decreasing the lowering speed of the arm 13 and another limit switch 27 or stopping the arm 14 are both mounted on a side of the controller 22 coupled to the clamper 20 and movable up and down therewith. Both switches 26 and 27 are operated when a dog 29 is lowered to thereby shorten the distance between the clamper 20 and the arm 13 and contact the limit switches.

Figure 4:
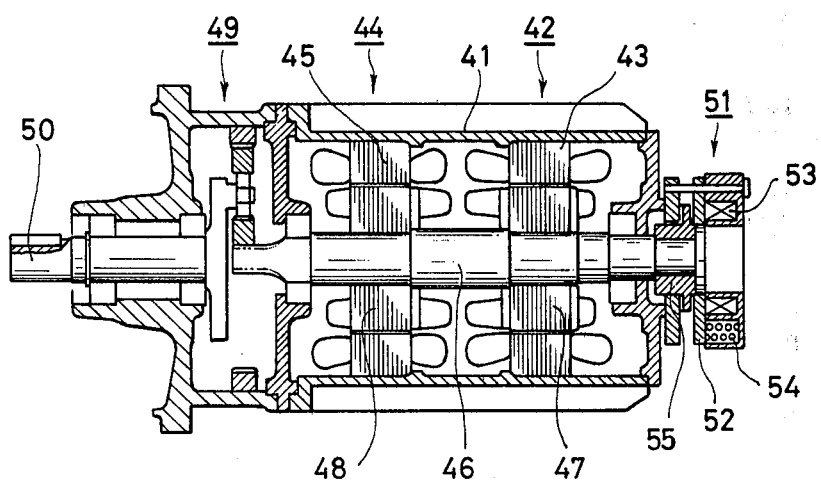
FIG. 4 is a cross-sectional view of the drive means of FIGS. 2 and 3.

One example of the drive member 16 is illustrated in FIG. 4. In this figure, reference numeral 41 designates a casing on which stators 43 of a drive motor 42 and stators 45 of a braking or dampening motor 44 are mounted. Reference numeral 46 denotes a rotary shaft on which a rotor 47 of the drive motor 42 and a rotor 48 of the braking motor 44 are mounted as shown. The rotational torque of the rotary shaft 46 is transmited to an output shaft 50 through reduction gearing means 49 well known per se.

The above described pinion 15 shown in FIG. 2 is coupled to the end of the output shaft 50. Reference numeral 51 designates a well known solenoid brake which is made up of a brake disc 52, coils 53 and springs 54. The solenoid brake is constructed so that in its deenergized or deactivated condition, the brake disc 52 is pushed against a disc 55 fixed to the other end of the rotary shaft 46, under the force of the springs 54, whereas when the coils 53 are energized, the brake disc 52 is attracted, to thereby release the disc brake 52 from the associated disc 55.

In operation, when no upward force is applied to a contact surface 18 of the clamper 20, the inner cylinder 17, the clamper 20 and the controller 22, both coupled to the inner cylinder 17, are lowered by the force of gravity and the spring 23, with the sleeve 24 in abutment with the flanged portion 25 so as to thereby maintain the maximum possible distance between the arm 13 and the clamper 20. In this manner, the inner cylinder 17 is supported by the arm 13. In this state, the handling device is moved by the laterally movable frame 12 guided by the guide rail 11 so that the clamper 20 is positioned directly above the pieces 31 stacked on the base station 30. Next, the arm 13 is lowered by the drive member 16. In the initial stage, the clamper 20, the inner cylinder 17 and the controller 22 are lowered together with the cylindrical arm 13. When the contact surface 18 of the clamper 20 contacts the upper surface of the uppermost piece, the lowering of the elements 20, 17 and 22 ceases. However, the arm 13 continues to be lowered while the spring 23 becomes compressed. Successively, the dog 29 moves together with the arm 13 and operates the limit switch 26 to thereby first reduce the lowering speed of the arm 13, and then operates the limit switch 27 to stop the lowering movement of the arm 13, as more fully explained hereafter. The dotted lines depicted in FIG. 2 indicate the lower portion of the arm 13 and the dog 29 in this state.

Next, the controller 22 is operated to clamp one piece 31 with the fingers 19 via the operational rod 21, as discussed hereafter, after which the arm 13 is lifted by the driving means 16. In this initial stage, only the arm 13 is lifted. When the upper end of the sleeve 24 contacts the flange 25, the inner cylinder and the clamper clamping the piece 31 are lifted together with the arm 13. After the arm 13 is lifted to a predetermined level, the handling device is moved to the machining station (not shown) and positioned directly thereabove the laterally movable frame 12. Then, the arm 13 is lowered to release the piece onto the machining station. As mentioned above, the piece 31 can be transferred from the base station to the machining station without a complicated servo mechanism. Since the contact surface 18 is in contact with the uppermost surface of the pieces 31 and the distance between the clamper 20 and the arm 13 is shortened to thereby stop the lowering movement of the arm 13, it is possible to transfer the pieces one-by-one from a total height which is gradually lowered. Also, as is clear from the above discussion, it is possible to transfer one-by-one the pieces 31, the total height of which is gradually increased by stacking in the case of transfer from the machining station to the other base station.

Figure 5:
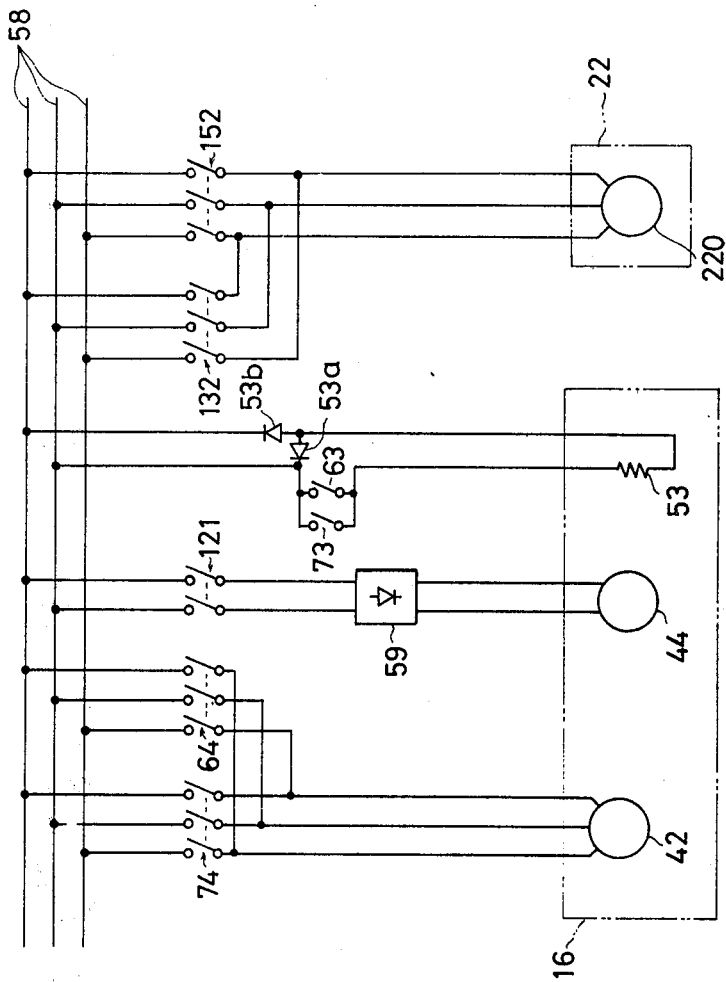
FIG. 5 and 6 are schematic diagrams of the control circuitry and associated devices for use with the apparatus of FIGS. 1–4.
Figure 6:
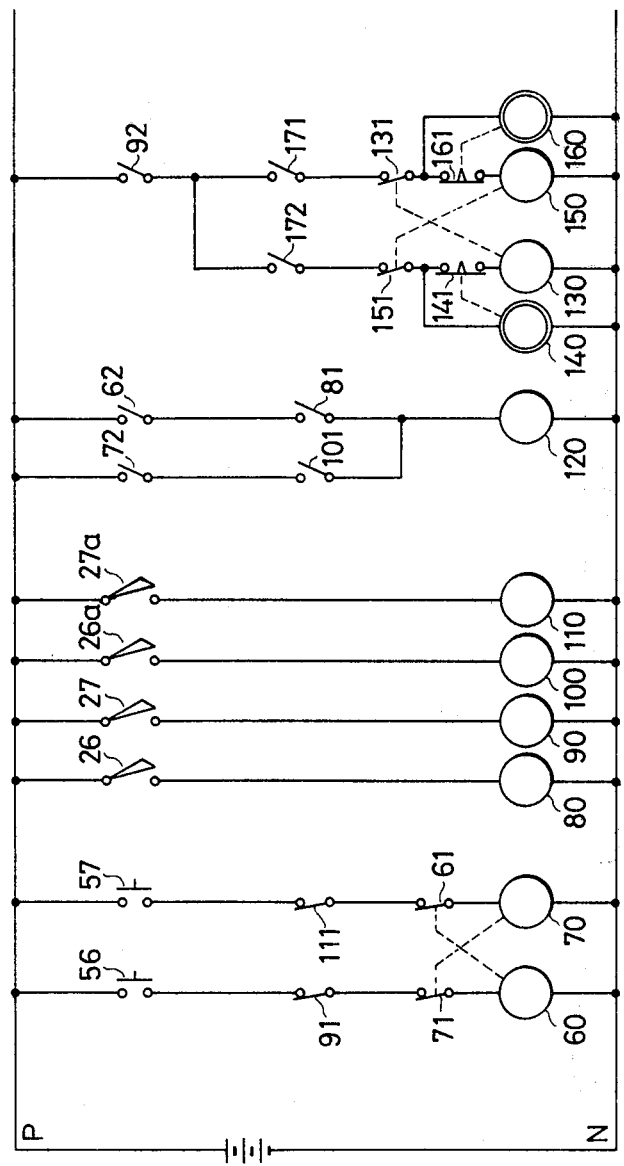

The operation of the device of FIGS. 1-4 will now be more particularly discussed, with reference to FIGS. 5 and 6 which illustrate one example of the controller 22 and the mechanisms associated therewith.

When the handling device is moved by the frame 12 and is positioned above the base station 30, the contact 56 shown in FIG. 6 is automatically or manually closed. Since a contact 91 of an arm lowering stop relay 90 and a contact 71 of an arm lifting relay 70 are normally closed, an arm lowering relay 60 is energized by the D.C. power source. A contact 61 provided in association with the relay 60, which is normally closed, is in turn opened, and also contacts 62, 63 and 64 (FIG. 5), which are normally opened, are closed. The opening of the contact 61 serves to prevent the power source from being short-circuited which might otherwise be caused by the malfunction of the arm lifting relay. The closure of the contact 62 does not exert any influence over the circuit at this time. The closure of the contact 63 causes the relese of the electro-magnetic brake 53. By the closure of the contacts 64, electric power is supplied from the three phase A.C. power source and the drive motor 42 is driven. As a result, the arm 13 is lowered.

When the arm 13 is lowered, the contact surface 18 of the clamper 20 impinges against the piece 31 (FIG. 2). The arm 13 is then further lowered while compressing the spring 23. Then, the dog 29 directly connected to the arm actuates the limit switch 26 (FIGS. 2 and 6). When the limit switch 26 is actuated, the arm lowering deacceleration relay 80 is energized. Then, a normally open contact 81 of the relay 80 is closed. Since the contact 62 has already been closed, a braking relay 120 (see FIG. 6) is energized and in turn a contact 121 (see FIG. 5) is closed, thereby driving the braking motor 44 of the drive member 16. When the braking motor 44 is driven, the arm lowering speed is reduced to about one-twentieth the speed prior to the exertion of the braking force.

When the dog 29 actuates the other limit switch 27, an arm lowering stop relay 90 is energized. The associated contact 91 of the relay 90 is in turn opened while the contact 92 which is normally opened is closed. Due to the opening of the contact 91, the arm lowering relay 60 is deenergized, so that its associated contact 61 is closed and the contacts 62, 63 and 64 (FIG. 5) are opened. With the closure of the contact 61, an arm lifting relay 70 can be energized if the contact 57 is closed. The opening of the contact 62 causes the deenergization the braking relay 120, and the opening of the associated contacts 121 of the relay 120 causes the deenergization of the braking motor 44. The opening of the contacts 64 causes the driving motor 42 to stop, and the opening of the contact 63 causes an interruption in the application of the voltage rectified via diodes 53a and 53b to the electromagnetic brake 53. Thus, the braking force of the electromagnetic brake 53 is produced and the lowering of the arm 13 is completely stopped.

Next, when a contact 171 (FIG. 6) is closed, a finger close relay 150 and a timer 160 are actuated at the same time. It should be noted that the contact 171 is closed depending upon various conditions of the system, e.g. whether or not there is a piece 31 on the base station 30. A contact 161 of the timer 160 is opened after a predetermined period of time has passed since the actuation of the timer 160. Accordingly, the finger close relay 150 is energized for the predetermined period. By using a contact 151 which is normally opened, the finger open relay 130 is prevented from being simultaneously actuated. Furthermore, a contact 152 (FIG. 5) which is normally opened is closed and the finger open/close motor 220 of the controller 22 is driven to actuate the rod 21. The time limit of the timer 160 is set so that the fingers 19 can firmly grip the piece 31.

After this predetermined period of time has lapsed, the finger close relay 150 is deenergized because the timer 160 opens its contact 161, and thus the contact 151 is closed while contacts 152 are openend. The driving of the finger open/close motor 220 is accordingly stopped.

Next, the arm 13 is lifted while gripping the piece 31 with the fingers 19. Limit switches and other components are provided to lift the arm (not shown in FIG. 2). The arm lift limit switches 26a and 27a (FIG. 6) are installed for operation with a dog (not shown) similarly as in FIG. 2.

The circuitry operation during arm lifting is similar in principle to that during arm lowering. Therefore, further detailed description is not believed necessary and is thus omitted herein. In the figures, for the arm lifting operating, reference numeral 57 designates an arm lifting instruction contact; 70, an arm lifting relay; 100, an arm lifting deaccelerating relay; 101 an associated contact of the relay 100 which is normally opened; 110, arm lifting stop relay; 111, an associated contact of the relay 110 which is normally closed; 130, a finger open relay; 131 and 132 are associated contacts of the relay 130 which are normally closed and opened, respectively; 140 is a timer; 141 is a contact of the timer 140, and reference numeral 172 designates a finger open instruction contact.

As mentioned above, according to the present invention, even in the case where the positional level at which the piece is clamped or released is varied, the transfer or stacking is carried out under the condition that the positions of the limit switches are maintained constant with respect to the top of the stack of pieces without an expensive memory and computer system. Thus, simple limit switches can be used with the invention. In a modification to the embodiment described above, it is possible to use an electromagnet or vacuum pad means instead of the above-described mechanical chuck operated through the operational rod.

What is claimed is:

1. A handling apparatus, comprising: a guide rail (11), a frame (12) laterally movable along said guide rail, a hollow cylindrical arm (13) movable in a vertical direction, an operating rod (21) passing through said hollow cylindrical arm, an inner cylinder (17) positioned within said cylindrical arm and around said operating rod, a spring (23) disposed between ends of said inner cylinder and said cylindrical arm for biasing said inner cylinder downwardly, stop means for said spring, clamping means (20) coupled to a lower end of said inner cylinder for clamping a top one of stacked workpieces (31), a controller (22) having a frame coupled to an upper end of said inner cylinder and being operationally coupled to said operating rod for operating said clamping means, a contact portion of said clamping means for contacting and sensing the uppermost surface of the workpiece whereby when the contact portion abuts against the uppermost surface of the workpiece only said cylinderical arm may be further lowered, switch means (26, 27) mechanically coupled to said controller for controlling movements of said cylindrical arm, and dog means (29) coupled at one end portion to said cylindrical arm and having a second end portion positioned adjacent said switch means for operating said switch means in accordance with the relative vertical positions of said cylindrical arm and said inner cylinder.

2. The handling apparatus according to claim 1 wherein said switch means comprises first and second limit switches mounted on an outer periphery of said controller, said first switch being porvided for decreasing the lowering speed of said cylindrical arm and the second switch being provided for stopping the lowering movement of said cylindrical arm.

3. The handling apparatus according to claim 1 further comprising means for vertically moving said hollow cylindrical arm.

4. The handling device according to claim 3 wherein said moving means comprising a rack member coupled to said cylindrical arm, a motor, and a pinion gear coupling said motor to said rack, said motor being controlled by said switch means.

* * * * *